(12) United States Patent
Almhill et al.

(10) Patent No.: US 9,371,041 B2
(45) Date of Patent: Jun. 21, 2016

(54) LOAD CARRIER FOOT AND A ROOF RACK

(71) Applicant: Thule Sweden AB, Hillerstorp (SE)

(72) Inventors: Stefan Almhill, Taberg (SE); Jonas Poulsen, Värnamo (SE); Markus Nordangård, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 14/653,754

(22) PCT Filed: Dec. 20, 2013

(86) PCT No.: PCT/EP2013/077663
§ 371 (c)(1),
(2) Date: Jun. 18, 2015

(87) PCT Pub. No.: WO2014/096347
PCT Pub. Date: Jun. 26, 2014

(65) Prior Publication Data
US 2015/0321618 A1    Nov. 12, 2015

(30) Foreign Application Priority Data

Dec. 21, 2012 (EP) .................................... 12199245

(51) Int. Cl.
*B60R 9/058* (2006.01)
*F16M 13/02* (2006.01)
*B60R 9/052* (2006.01)

(52) U.S. Cl.
CPC ............... *B60R 9/058* (2013.01); *F16M 13/02* (2013.01); *B60R 9/052* (2013.01)

(58) Field of Classification Search
CPC .......... B60R 9/058; B60R 9/052; B60R 9/04; B60R 9/00; B60R 9/10; B60R 9/12; B60R 9/08; B60R 9/05; B60R 9/042
USPC .................. 224/329–331, 322–323, 314, 319
See application file for complete search history.

(56) References Cited

U.S. PATENT DOCUMENTS 3,064,841 A * 11/1962 Ellingson .............. B60P 3/1025
224/310
3,064,868 A * 11/1962 Treydte ................... B60R 9/058
224/322

(Continued)

FOREIGN PATENT DOCUMENTS

| CH | 555 756 | 11/1974 |
|---|---|---|
| EP | 2 380 777 | 10/2010 |
| JP | S 59 155247 | 10/1984 |

OTHER PUBLICATIONS

International Search Report and Written Opinion of the International Searching Authority for International Appl. No. PCT/EP2013/077663, European Patent Office, Rijswijk, Netherlands, mailing date of Mar. 14, 2014, 9 pages.

(Continued)

*Primary Examiner* — Justin Larson
*Assistant Examiner* — Scott McNurlen
(74) *Attorney, Agent, or Firm* — Sterne, Kessler, Goldstein & Fox P.L.L.C.

(57) ABSTRACT

A load carrier foot for attaching a load carrier bar to a vehicle and a roof rack having the load carrier foot. The load carrier foot includes a body having a support surface, where the support surface is adapted to rest against a first portion of the vehicle, and a bracket having an aperture adapted to grip about a second portion of the vehicle. An attachment arrangement provides a clamping force between the support surface of the body and the bracket. The bracket includes an aperture adapted to permit the attachment arrangement to be positioned between two positions to enable an easy mounting and dismounting of the load carrier foot.

11 Claims, 11 Drawing Sheets

(56) References Cited

U.S. PATENT DOCUMENTS

| | | | | |
|---|---|---|---|---|
| 3,920,167 A | * | 11/1975 | Parsons | B60R 9/058 224/323 |
| 4,166,560 A | * | 9/1979 | Werner | B60R 9/12 224/315 |
| 4,469,261 A | * | 9/1984 | Stapleton | B60R 9/045 224/321 |
| 4,500,020 A | * | 2/1985 | Rasor | B60R 9/045 224/321 |
| 5,845,828 A | * | 12/1998 | Settelmayer | B60R 9/045 224/321 |
| 5,871,190 A | * | 2/1999 | Henriksson | B60R 9/058 224/331 |
| 6,516,985 B1 | * | 2/2003 | Lundgren | B60R 9/058 224/322 |
| 2012/0228348 A1 | * | 9/2012 | Aftanas | B60R 9/058 224/309 |

OTHER PUBLICATIONS

European Search Report for European Application No. EP 12 19 9245.7, European Patent Office, Berlin, Germany, dated Apr. 30, 2013, 5 pages.

* cited by examiner

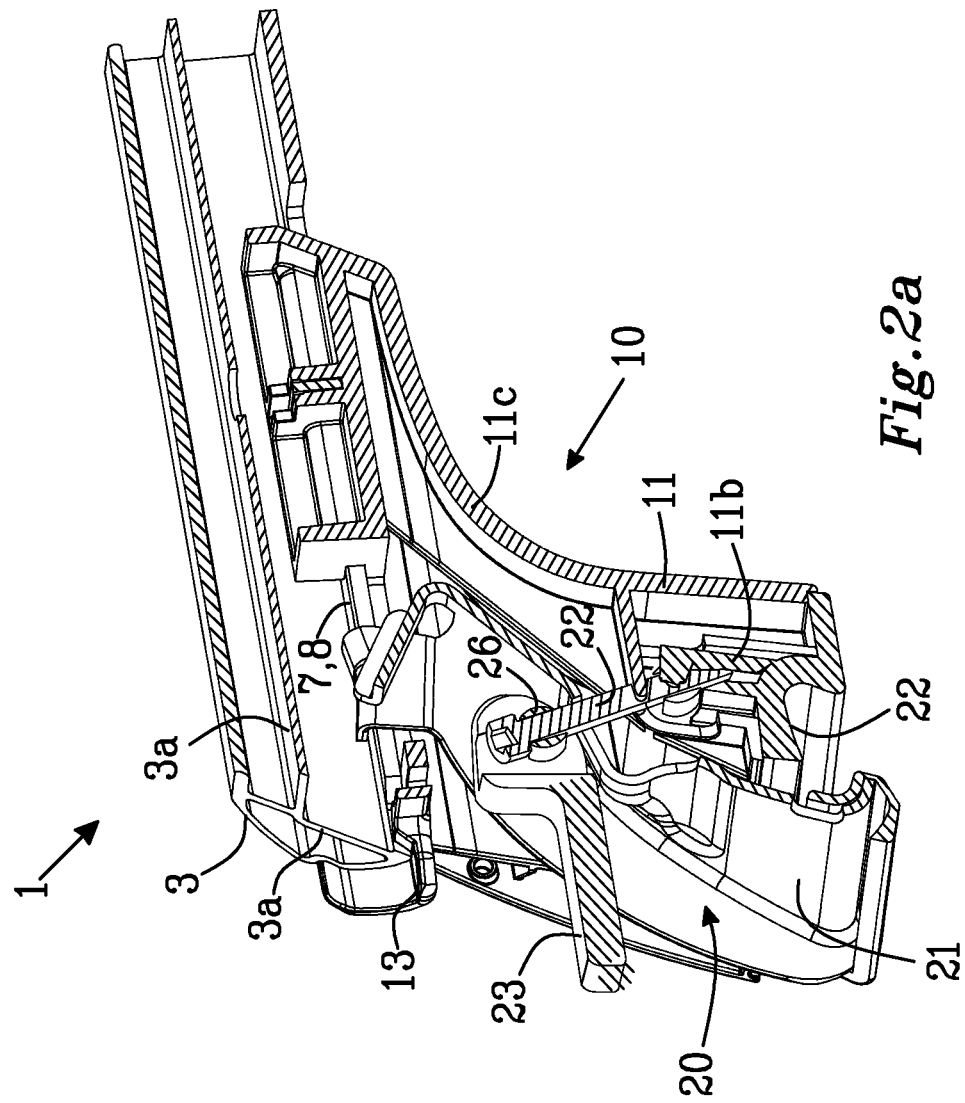

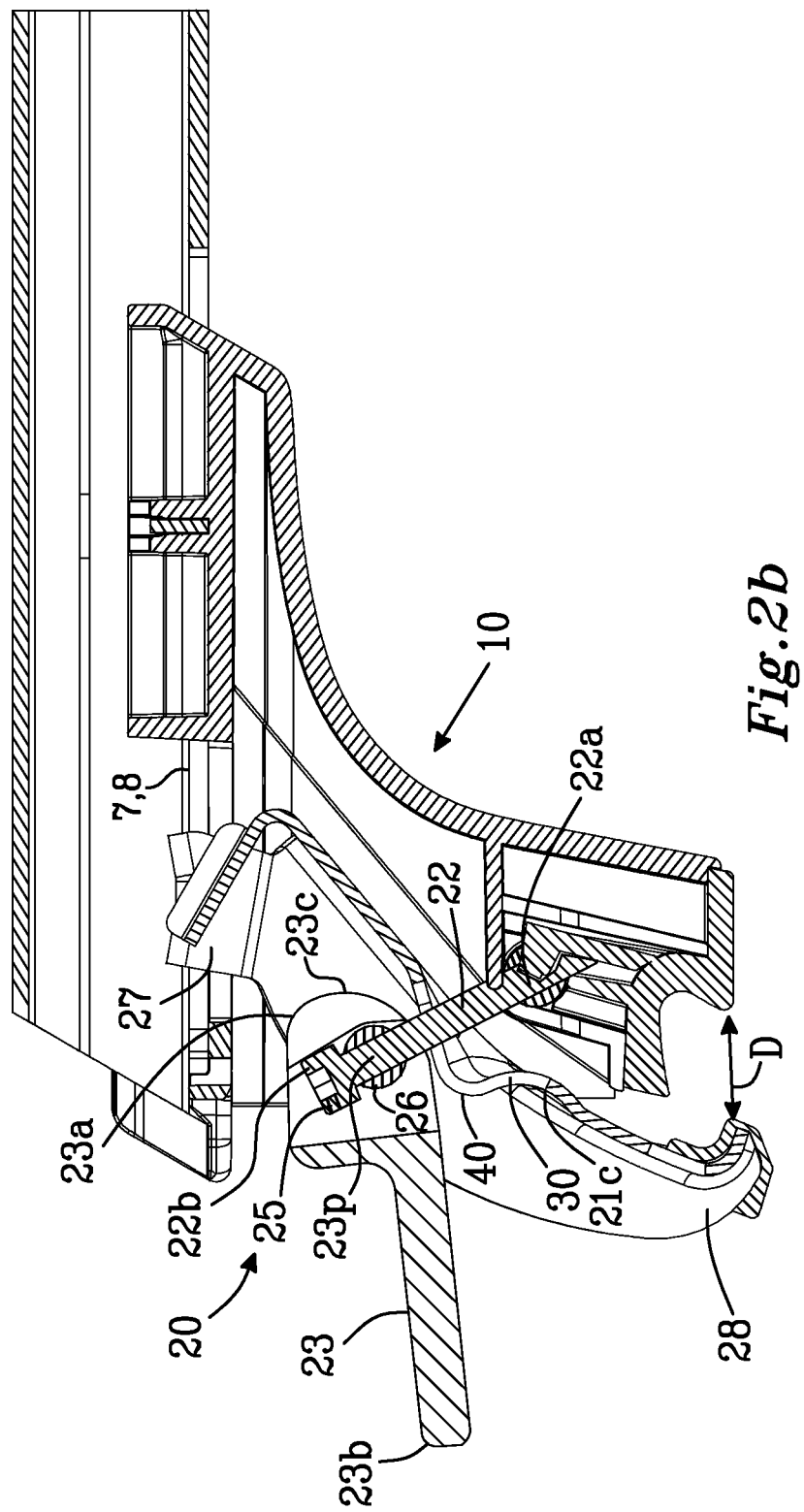

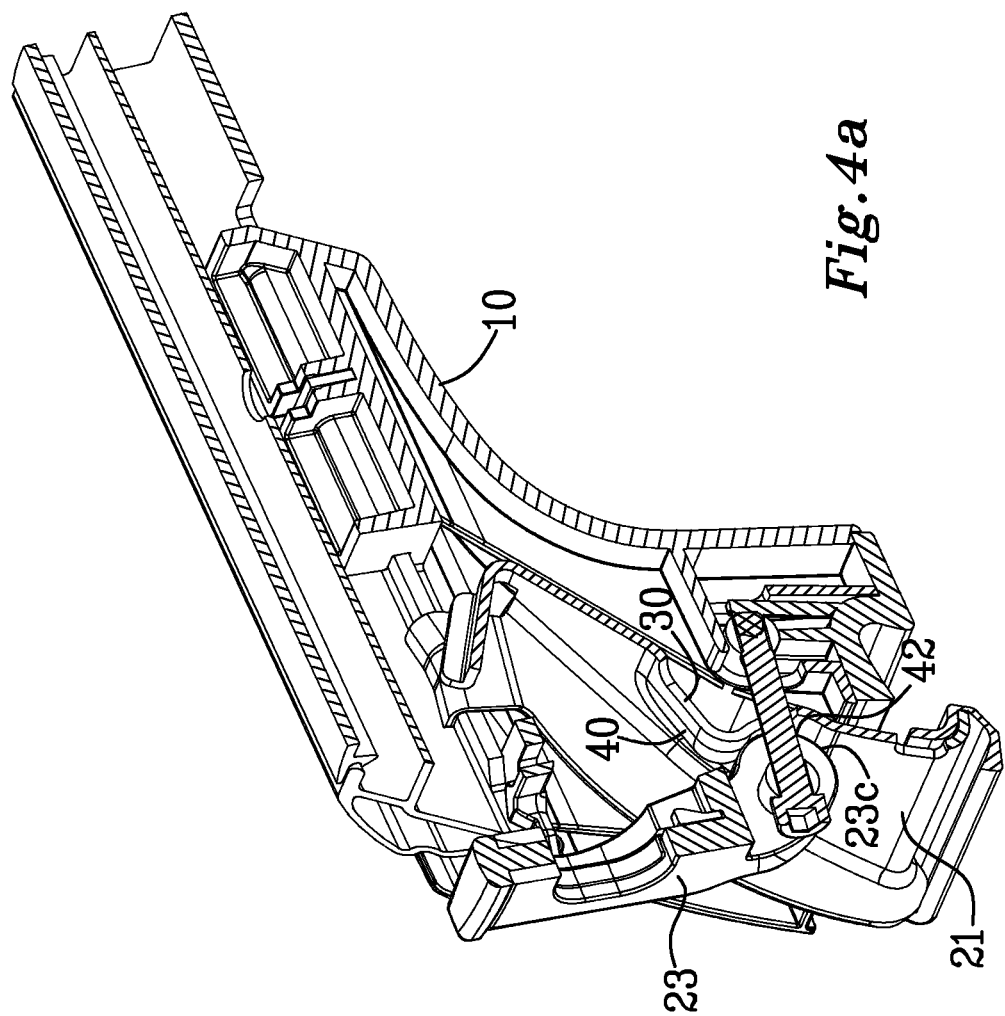

LOAD CARRIER FOOT AND A ROOF RACK

TECHNICAL FIELD

A load carrier foot and a roof rack comprising a first and a second load carrier foot. The load carrier foot comprises a support surface adapted to rest against a first portion of a vehicle, and a bracket, adapted to grip about a second portion of the vehicle. An attachment arrangement is adapted to impart a clamping force between the bracket and the support surface. The bracket is specifically adapted to the attachment arrangement, providing the attachment arrangement with at least two different positions; a ready position and a release position.

BACKGROUND OF THE INVENTION

Roof racks comprising a load carrier bar and a first and a second load carrier foot are widely used to provide an automobile with an extended load capacity. When an automobile collides, either with another moving automobile or with a stationary object, the crash violence imparted to the vehicle is usually significant and can impair severe structural damages the automobile. A load, carried on a roof rack, has its own inertia as the automobile moves. In case of a collision, it is very important that the load on the roof rack is not accidentally released from the roof rack but remains on the roof rack. Equally important is that the roof rack itself is safely retained to the automobile. Throughout the development of the load carrier foot for roof racks, safety has always been a premiered function.

Tools, such as wrenches, are usually used to provide a strong coupling and to readily fix the load carrier foot to the roof of the automobile. However, using tools such as a wrench is not always optimal from a user perspective. It may be that a tool is not available, hence to achieve real ease of use, a load carrier foot which can be fixed to the roof of an automobile without a tool i.e. which a user can fix with his/hers own hands, is preferable.

The European patent application no. EP 2,380,777 A1 discloses a clamp rack load carrier foot for a vehicle, the clamp rack load carrier foot comprises a grip member connected to a load carrier bar via an intermediate member, the clamp rack load carrier foot further comprises a body, and a screw. The screw is connected to the intermediate member and the grip member for providing an attachment arrangement. The clamp rack load carrier foot can however be improved, both in terms of ease to handle, time to mount, and safety.

SUMMARY

It is an objective of the present invention to solve, or to at least reduce the above mentioned drawbacks, or to at least provide a useful alternative. The objective is at least partly met by a load carrier foot for attaching a load carrier bar to a vehicle. The load carrier foot comprises a body comprising a support surface; the support surface is adapted to rest against a first portion of the vehicle, preferably a rail of the vehicle. A bracket comprising an aperture, the bracket is adapted to grip about a second portion of the vehicle, such as another portion of the rail of the vehicle. The load carrier foot also comprises an attachment arrangement for providing a clamping force between the support surface of the body and the bracket. A portion of the attachment arrangement extends through the aperture of the bracket.

The aperture of the bracket is an elongated aperture, wherein the portion of the attachment arrangement is displaceable along the elongated aperture between at least a release position and a ready position. In the ready position, the attachment arrangement is enabled to impart the clamping force.

The load carrier foot has a bracket which is configured to cooperate with the attachment arrangement to enable at least two different positions for a portion of the attachment arrangement, the different positions can be utilized to provide a simple yet sturdy attachment configuration. The load carrier foot is easy to use as the attachment arrangement can be displaced between a release position, in which the load carrier foot can be mounted and dismounted to e.g. a rail of a vehicle, and a ready position, in which the attachment arrangement can be made to impart a clamping force to fix the load carrier foot to the rail of the vehicle.

According to an aspect, the attachment arrangement comprises an elongated element and a fastening member, such as a lever or a nut, wherein the elongated element extends through the elongated aperture. The elongated element can thus be displaced along the elongated aperture between at least the release position and the ready position. The elongated element can be pivotally connected to the body of the load carrier foot at one end and arranged in working cooperation with the lever or the nut in the other end thereof.

The lever can be pivotally connected to the elongated element for example.

According to an aspect, the fastening member is a lever comprising a cam surface adapted to be braced against a cam surface of the bracket to provide the clamping force when the elongated element is positioned in the ready position. A lever permits a user to easily fasten the load carrier foot to the vehicle, while not compromising with the sturdiness of the connection between the load carrier foot and the vehicle.

The bracket can be formed in a wide variety of ways to provide a good reliable connection. One way to provide a good reliable connection is to form at least parts of the cam surface of the bracket by a ridge comprising a crest. The lever, or fastening member, can in this case be prevented by the ridge from accidentally come loose and slide along the elongated aperture after it has been tightened. The ridge can be formed by a fold, a dent-like protrusion, an attached protruding member or the like. The ridge is advantageously at least partly formed by a portion of the bracket or it is formed by a separate piece of material with respect to the bracket. The separate piece of material can be an adhered piece of material for example, or a piece of material attached by rivets and/or screws to the bracket. It may be advantageous that the ridge and the bracket are made from different types of material or the same material. The bracket can be manufactured from sheet metal and the ridge can be a resin or composite based material for example.

At least a portion of the ridge and the crest can have an extension substantially perpendicular to the elongated aperture so that the crest of the ridge intersects with the elongated aperture.

According to an aspect, the ready position and the release position are separated by the crest of the ridge. This has been found especially advantageous when at least a portion of the ridge and the crest have an extension substantially perpendicular to the elongated aperture so that the crest of the ridge intersects with the elongated aperture.

According to an aspect, the cam surface of the bracket comprises a first and a second cam surface, the first and the second cam surfaces being separated by the elongated aperture. It has been found advantageous if the fastening member, preferably a lever, is cooperating with a cam surface on either side of the elongated aperture.

According to an aspect, the bracket comprises a load carrier bar retaining portion, the load carrier bar retaining portion of the bracket is adapted to cooperate with the load carrier bar. As the attachment arrangement is tensioned, i.e. the bracket of the load carrier foot is tensioned to the vehicle by imparting the clamping force, the load carrier foot can be fixed from displacement with respect to the load carrier bar as the bracket is adapted to cooperate with the load carrier bar. The load carrier bar retaining portion advantageously extends into the load carrier bar and cooperates with an interior surface of the load carrier bar, preferably an interior surface facing the load carrier foot. Few components are used in this load carrier foot while still providing a strong and sturdy connection to the vehicle.

According to an aspect, the attachment arrangement comprises an extendable lever, preferably extendable in a telescopic manner. The lever can comprise a first and a second member, wherein the first member is pivotally connected to the elongated element, and the second member of the lever is telescopically arranged to the first member for example. This permits a high leverage while still permitting the lever to be positioned in a confined space.

According to an aspect, the cam surface of the lever has a form corresponding to the form of the cam surface of the ridge of the bracket, at least along a cross section. Having corresponding forms of the cam surfaces provides for a steady and strong connection.

According to an aspect, the elongated aperture comprises a first and a second end, the first end being distanced from the second end in a vertical direction. The elongated aperture advantageously extends from a lower portion of the bracket to an upper portion of the bracket. A transverse centreline can be used to define the upper and the lower portion of the bracket, the elongated aperture thus at least extends across the transverse centreline of the bracket.

According to an aspect, the release position and the ready position is defined by the first and the second end of the elongated aperture.

According to an aspect, the elongated aperture extends across the cam surface of the bracket.

BRIEF DESCRIPTION OF THE DRAWINGS

Non-limiting embodiments of the present invention will be described in greater detail with reference to the accompanying figures in which;

FIGS. 2a-2b show a load carrier foot with the attachment arrangement in a release position, the load carrier foot being ready to be mounted or dismounted from a vehicle;

FIGS. 4a-4b show a load carrier foot with the attachment arrangement, in the shown embodiment comprising a lever, in a lock position, the load carrier foot being attached to the vehicle and ready to receive and carry a load;

DETAILED DESCRIPTION OF PREFERRED EMBODIMENTS

Figure 1:
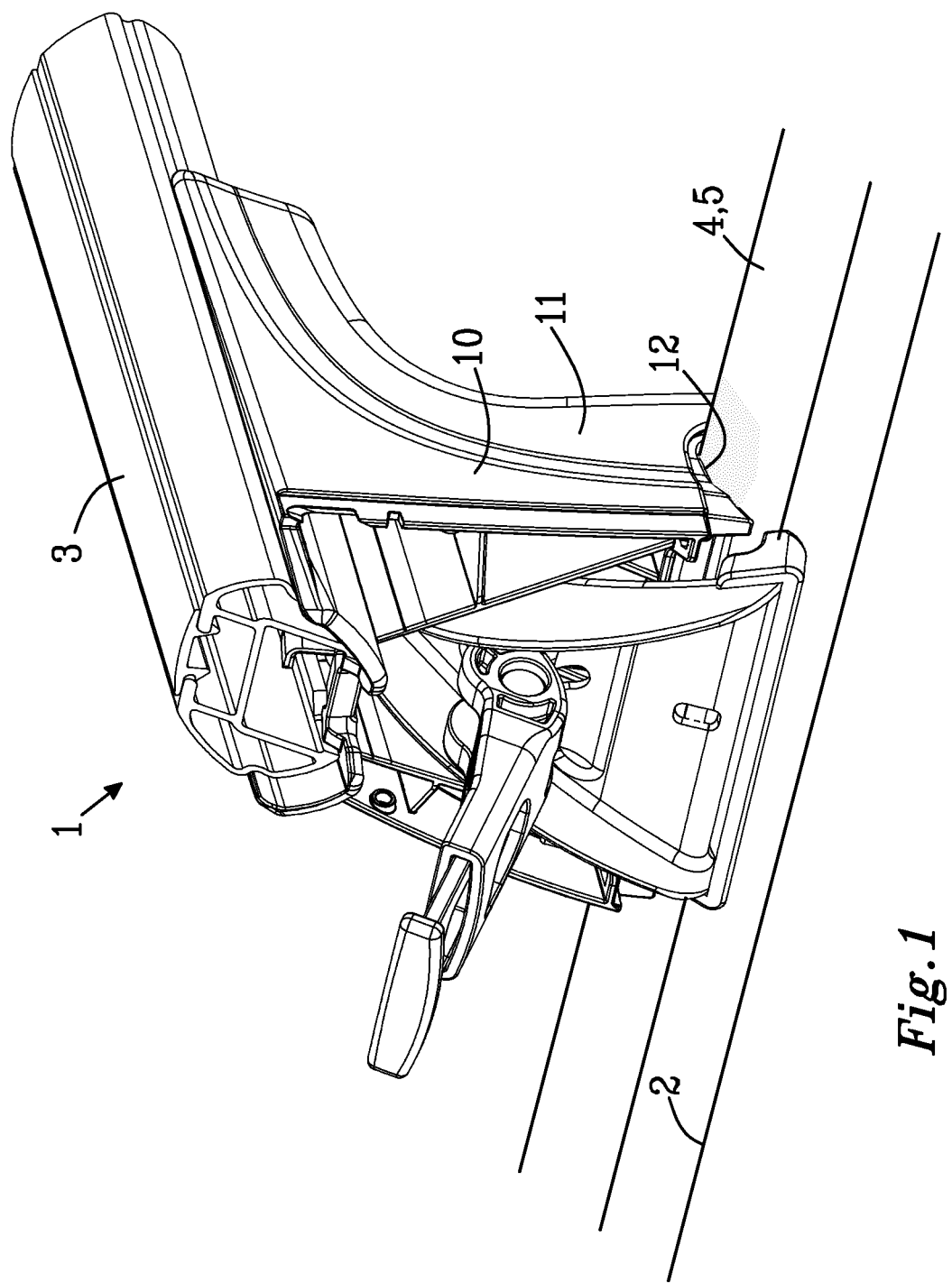
FIG. 1 show a load carrier foot in perspective, comprising a body, bracket and an attachment arrangement.

FIG. 1 shows parts of a roof rack 1 for a vehicle 2. The roof rack 1 comprises a load carrier bar 3 and at least one load carrier foot 10, preferably a first and a second load carrier foot 10. The load carrier foot 10 is in this case a clamp rack load carrier foot, but hereafter only referred to as a load carrier foot. The roof rack 1 is generally used to provide a vehicle, such as an automobile, with an increased load capacity. The load carrier foot 10 comprises a body 11 comprising a support surface 12 adapted to rest against a surface 4 of the vehicle 2, preferably a rail 5 of the vehicle 2.

Figure 2C:
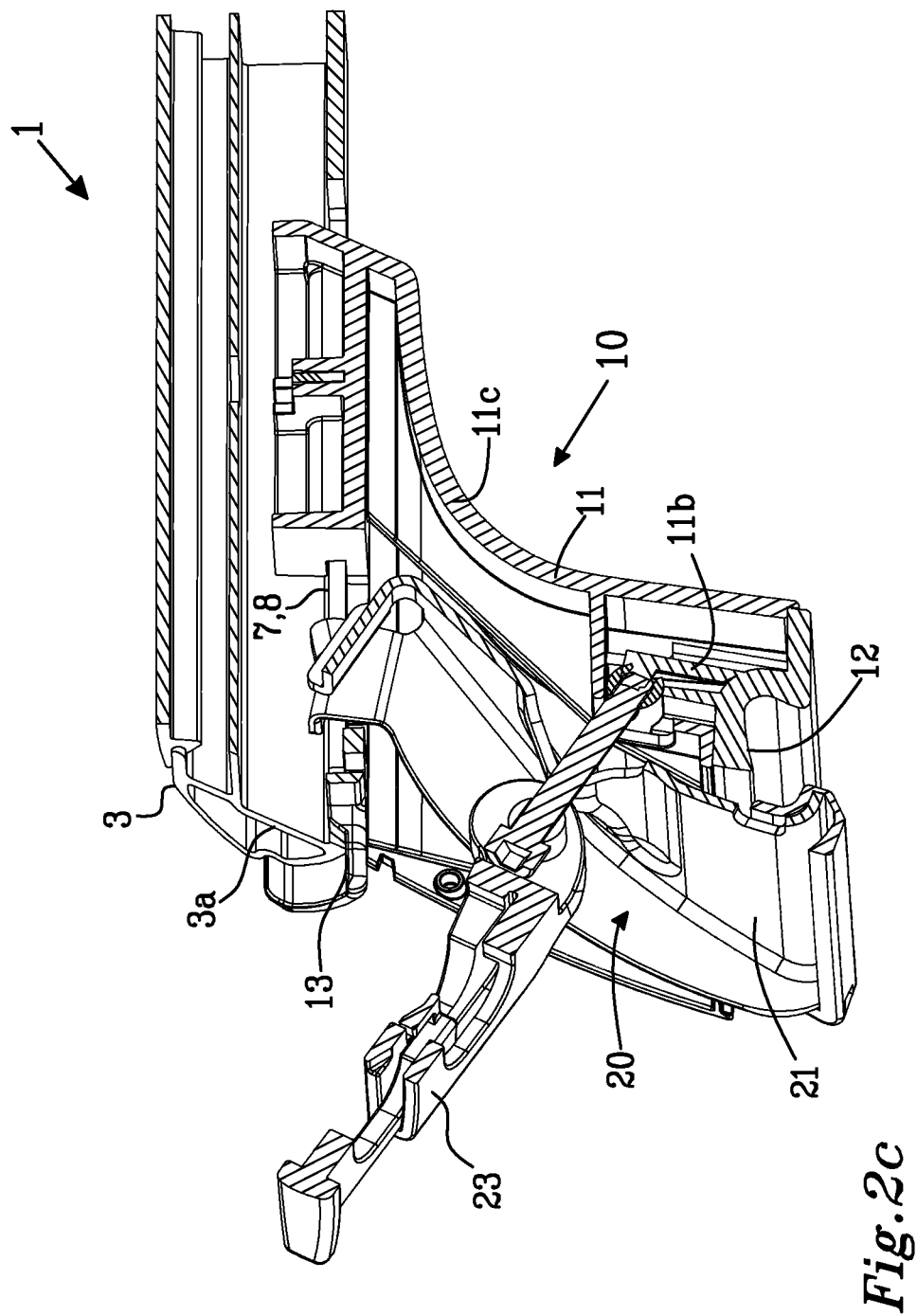
FIGS. 2c-2d show a load carrier foot with the attachment arrangement substantially between a release position and a ready position.

FIGS. 2a-2d shows a cross section of the load carrier foot 10 of FIG. 1. FIG. 2a shows the body 11 comprising a support surface 12 adapted to rest against a surface 4 of the vehicle 2, preferably a rail 5 of the vehicle 2 (shown in FIG. 1). FIG. 2b shows the load carrier foot 10 of FIG. 1 in cross section and from the side. Reference is made to FIGS. 2a-2b simultaneously. The body 11 further comprises a load carrier bar receiving surface 13 onto which the load carrier bar 3 is adapted to rest.

The load carrier foot 10 comprises an attachment arrangement 20 for attaching the load carrier foot 10 to the vehicle and more precisely the rail of the vehicle. The attachment arrangement 20 comprises a grip member, in the form of a bracket 21, an elongated element 22, in this embodiment in the form of a screw, and a lever 23, or handle.

The load carrier bar 3 comprises a substantially hollow interior partitioned by supportive walls 3a. A bottom wall 7 is positioned adjacent the body 11 of the load carrier foot 10. The bracket 21 is adapted to cooperate with the interior of the load carrier bar 3 so that when the bracket 21 is tightened and gripping about the rail 5 and the roof rack 1 is readily secured to the vehicle, the bracket 21 also retains the load carrier bar 3 to the load carrier foot 10 from displacement. More specifically, the bracket 21 is adapted to cooperate with an interior surface 8 of the bottom wall 7 of the load carrier bar 3. The bracket 21 thus comprises a load carrier bar retaining portion 27 and a rail retaining portion 28, wherein the elongated aperture 30 is positioned between these portions. The bracket 21 is adapted to grip about a surface of the rail and to provide a clamping force between the support surface 12 of the body 11 of the load carrier foot 10 and the bracket 21 when being braced by the lever 23.

The bracket 21 can be manufactured from sheet metal such as sheet steel, or any suitable composite or resin based material. The bracket 21 comprising the load carrier bar retaining portion 27 and the rail retaining portion 28 can preferably be formed in one unitary piece of material, although at least the load carrier retaining bar portion 27 and a rail retaining portion 28 can be individual parts connect to at least one intermediate member or directly with each other.

The elongated element 22 comprises a first and a second end 22a, 22b. The first end 22a of the elongated element 22 is pivotally attached to the body 11 of the load carrier foot 10.

The body 11 can be formed by one or more individual members. For example, the elongated element 22 can be pivotally connected a base member 11b comprising the support surface 12. A bar carrying member 11c is connected to the base member 11b, the bar carrying member 11c comprises the load carrier bar receiving surface 13. The support surface 12 advantageously comprises a rubber like material to provide high friction yet a lenient surface towards the rail 5 of the vehicle 2.

The bracket 21 comprises an elongated aperture 30 through which the elongated element 22 extends. The lever 23 has an elongated form comprising a first and a second end 23a, 23b. The elongated element 22 is pivotally connected at a pivot point 23p in the proximity of the first end 23a of the lever 23. The elongated element 22 is pivotally connected to the lever 23 in the proximity of the second end 22b of the elongated element 22. A head 25 defines the second end 22b of the elongated element 22. A pin member 26 comprising an aperture retains lever 23 to the elongated element 22. The elongated element 22 extends through the pin member 26 so that the pin member 26 extends substantially perpendicular to the elongated element 22. The pin member 26 is pivotally connected to the lever 23 providing the pivot point 23p. The pin member 26 can optionally be pivotally connected to the elongated element 22 permitting rotation of the lever 23 about a second axis.

The important function of the elongated aperture 30 is to enable the lever 23 and the elongated element 22 to be positioned in at least two positions, so that the load carrier foot 10 can be easily mounted and dismounted.

The elongated element 22 can be a flexible elongated element, such as a wire, or a rigid elongated element such as a rod, bolt, screw or a member similar thereto. It can be made from metal, such as steel, or any suitable composite or resin based material. It can further be somewhat elastic to provide connection properties similar to an elastic joint connection.

The first end 23a of the lever 23 further comprises a cam surface 23c adapted to cooperate with a cam surface 21c of the bracket 21. The pivot point 23p is arranged substantially between the first and the second end 23a 23b of the lever 23 although in the proximity of the first end 23a of the lever 23, i.e. substantially closer to the first end 23a of the lever 23 than to the second end 23b of the lever 23.

As mentioned, the bracket 21 comprises an elongated aperture 30 through which the elongated element 22 extends. The elongated aperture 30 has a substantially elongated form, shown in FIG. 5 in greater detail, enabling the elongated element 22, and thus the lever 23, to be positioned in at least a first and a second position. The first position, shown in FIGS. 2a, 2b is a release position. In the release position, the grip member 21 is sufficiently displaced with respect to the body 11 so that the load carrier foot 10 can be dismounted from the rail 5 of the vehicle 2, or to be mounted on the rail 5 of the vehicle 2. The displacement, or gap, is indicated with a distance D in FIG. 2b. As is also notable in FIGS. 2a-2b, the bracket 21 comprises a ridge 40 adapted to cooperate with the cam surface 23c of the lever 23 as will be described below.

Figure 2D:
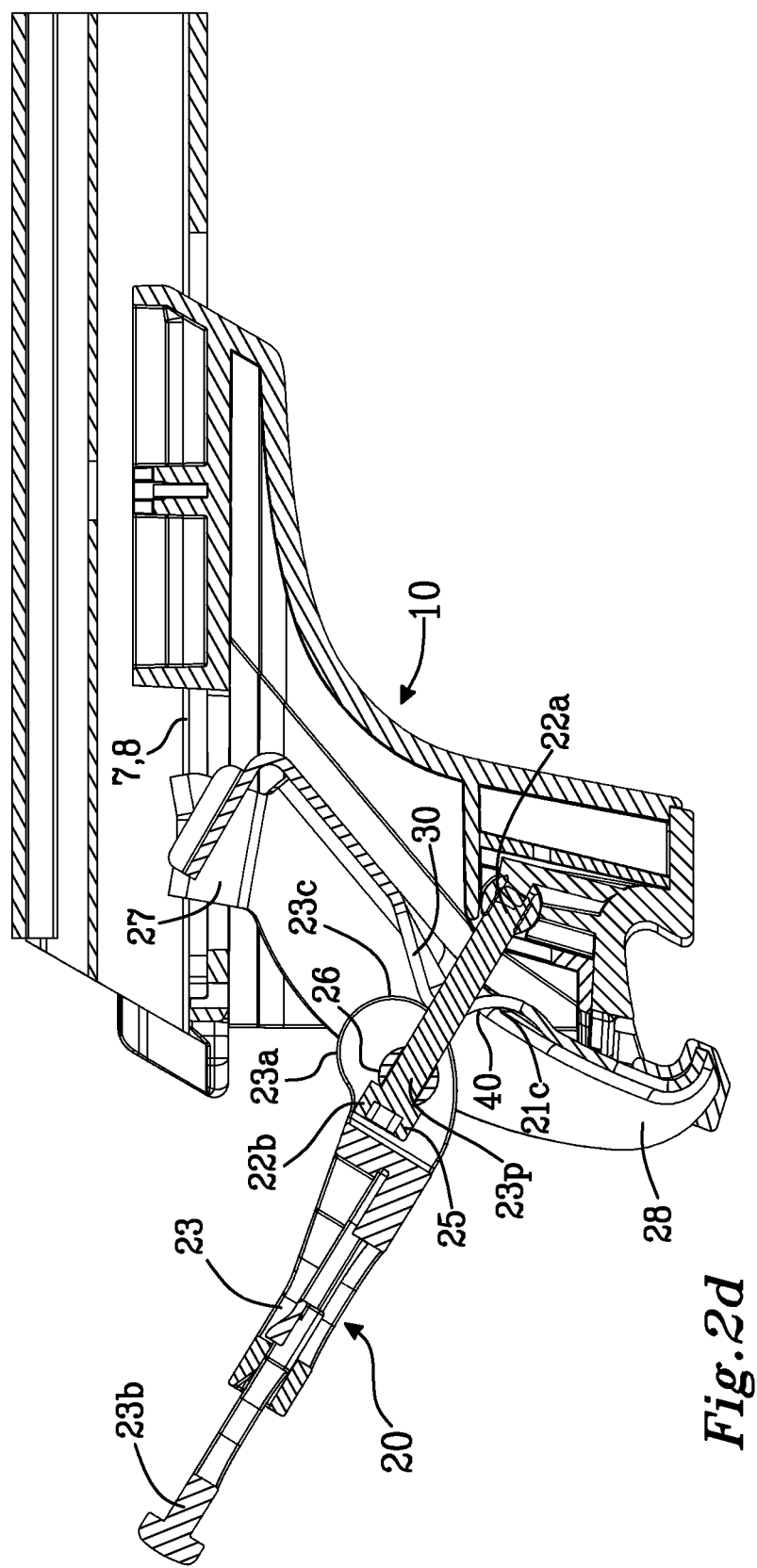

FIGS. 2c-2d shows the load carrier foot 10 but with the elongated element 22, and the lever 23 slightly displaced from the first position, i.e. the release position, just before the first end 23a of the lever 23 passes the crest of the ridge 40. For the sake of clarity, the reference numerals of FIG. 2a-2b are shown also in FIGS. 2c-2d.

Figure 3A:
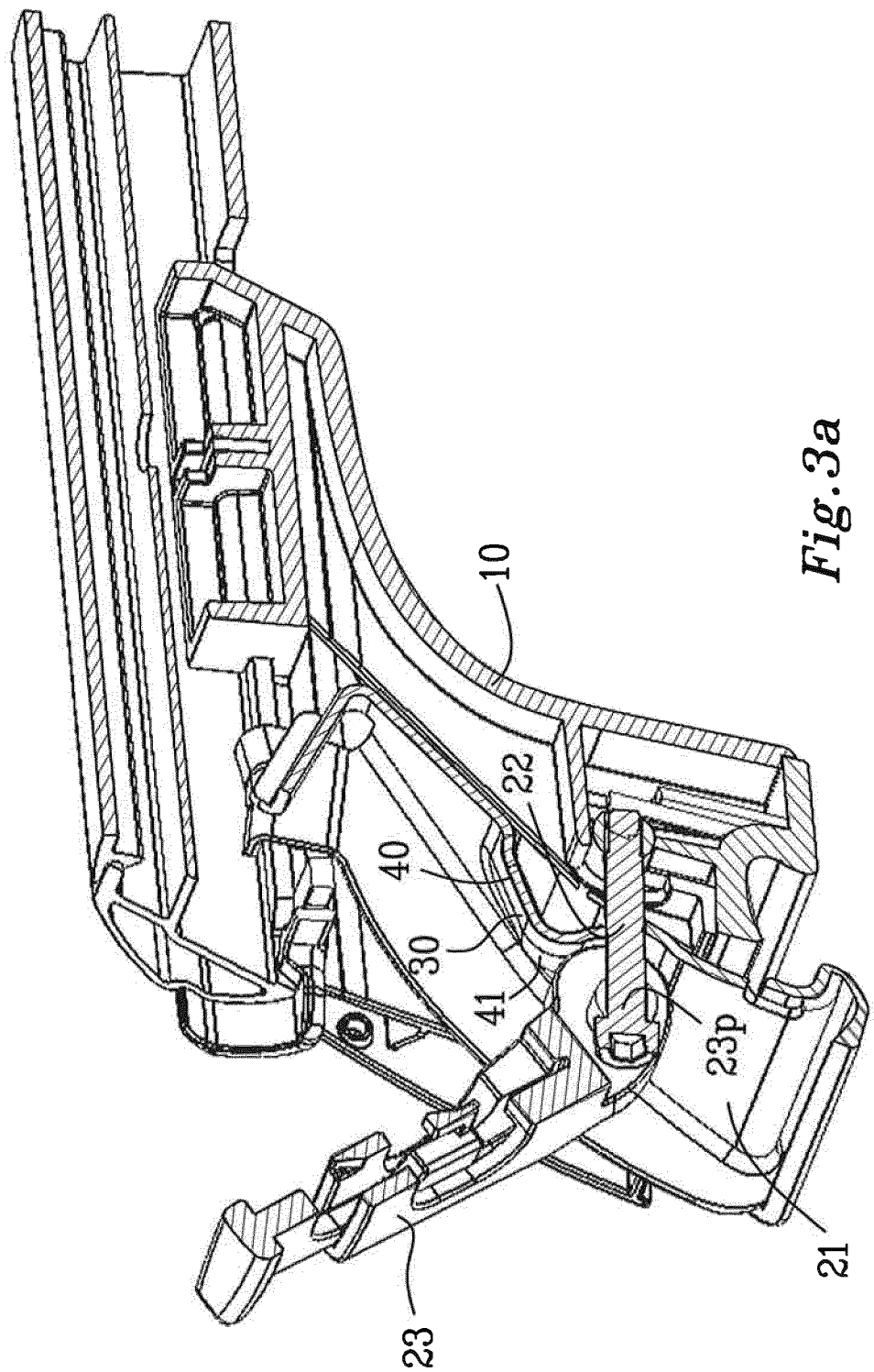
FIGS. 3a-3b show a load carrier foot with the attachment arrangement, in the shown embodiment comprising a lever, in a ready position, the load carrier foot being ready to be tightened to a lock position.
Figure 3B:
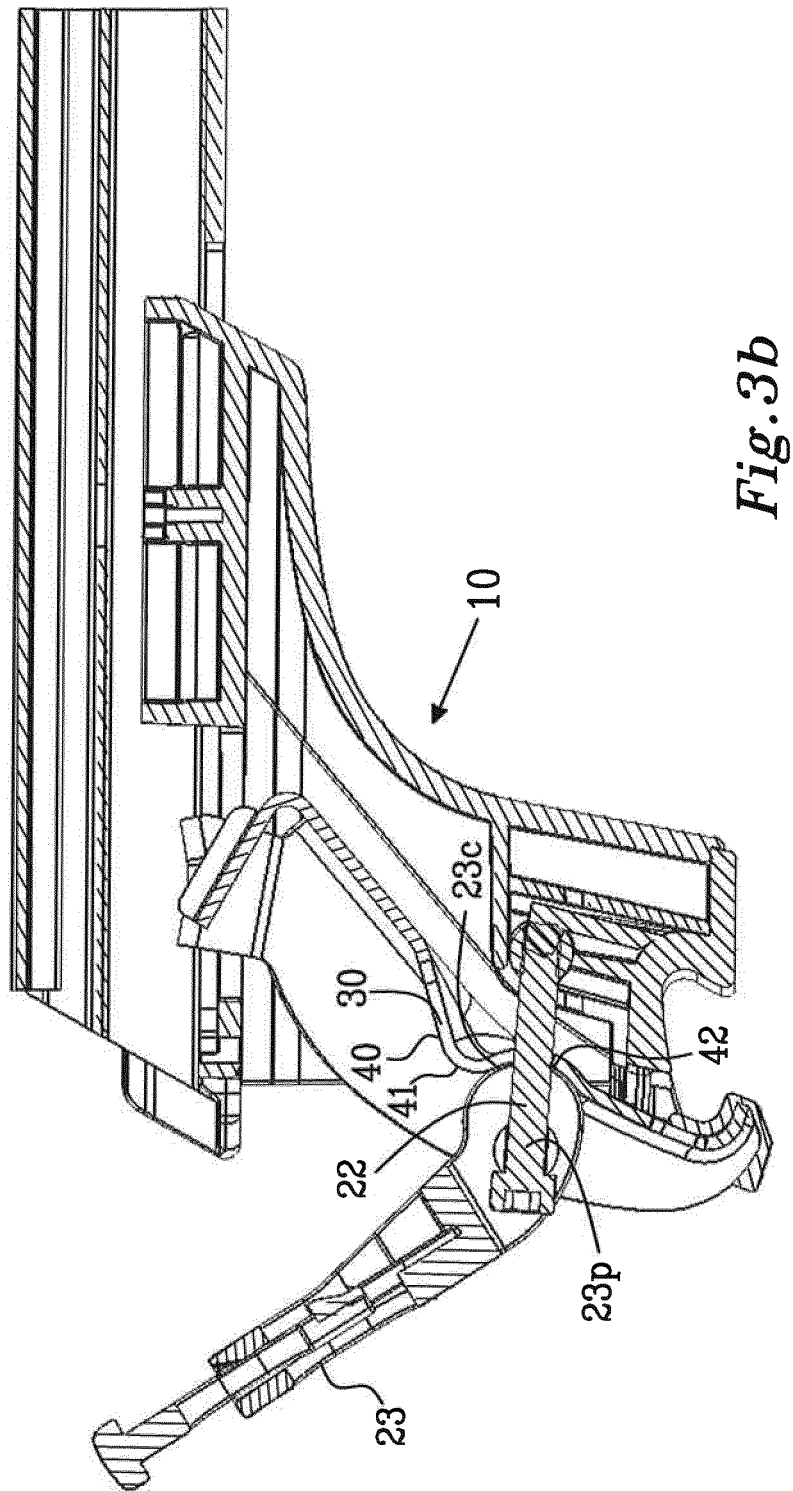

FIGS. 3a-3b show the load carrier foot 10 of FIG. 1 with the elongated element 22 in the second position, a ready position, in which the lever 23 can be pivoted about the pivot point 23p (also shown in FIGS. 2b and 2d) to brace the grip member 21 to a lock position, so that the load carrier foot 10 is retained on the rail 5 of the vehicle 2.

The elongated aperture 30 has a substantially elongated extension along which the elongated element 22 can be displaced between the first and the second positions. The elongated aperture 30 is further associated with the ridge 40 comprising a crest 41. The ridge 40 is in the shown embodiment integrally formed by the bracket 21 but could optionally be formed by a separate piece of material with respect to the bracket 21. The crest 41 of the ridge 40 of the bracket 21 is positioned between the release position and the ready position.

The ridge 40 provides a cam surface 42 against which the lever 23 can brace against to lock the load carrier foot 10 to the vehicle 2 (shown in FIG. 1).

Figure 4B:
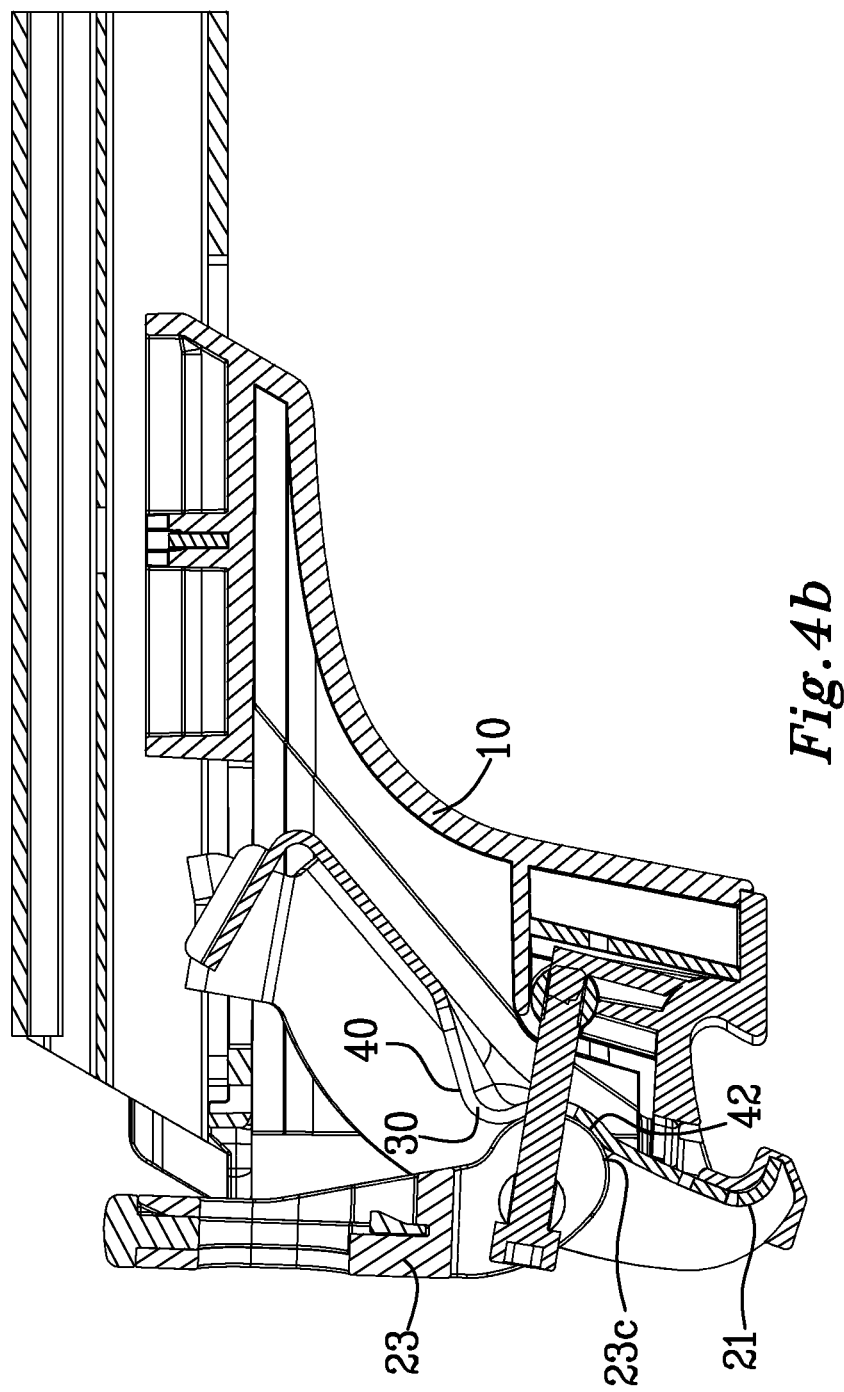

FIGS. 4a-4b show the load carrier foot 10 of FIGS. 3a-3b after the lever 23 has been pivoted to a lock position, and thus locked the bracket 21 and the load carrier foot 10 on the vehicle 2 (shown in FIG. 1). As is notable, the cam surface 23c of the lever 23 is tensioned against the cam surface 42 of the ridge 40. When the lever 23 is positioned in the lock position, as shown in FIGS. 4a-4b, the ridge 40 prevents the lever 23 from being moved along the elongated aperture 30 to the release position, shown in FIGS. 2a-2b.

The elongated aperture 30 extends substantially in a vertical direction, preferably between a lower part of the bracket 21 and an upper part of the bracket 21 when positioned as shown in FIGS. 4a-4b.

The method for mounting and releasing the load carrier foot 10 will be described hereafter. With reference to FIGS. 2a-2b; the load carrier foot 10, and the bracket 21, is initially positioned in the release position, prepared to be mounted to the rail 5 of the vehicle 2. To make sure that the lever 23 and the elongated element 22 is in the release position, the lever 23 can be pivoted downwards, i.e. towards the vehicle 2 and the elongated element 22 can be pushed, via the lever 23, to the upper end (first end) of the elongated aperture 30. The bracket 21 is now distanced from the support surface 12 of the load carrier foot 10. The support surface 12 of the load carrier foot 10 is now rested against the rail 5 of the vehicle 2, and the bracket 21 is positioned so that the bracket 21 grips about the rail 5, i.e. a second portion, of the vehicle 2. The second load carrier foot (not shown) is positioned in a similar manner so that the load carrier bar 3 extends across the roof of the vehicle 2. When the load carrier foot 10 is positioned on the rail 5 of the vehicle 2, the lever 23 and the elongated element 22 can be positioned in the ready position, via the position shown in FIGS. 2c-2d.

The elongated element 22 is pivoted downwards, i.e. towards the vehicle 2, by means of the lever 23 and positioned in the ready position. The cam surface 23c of the lever 23 is displaced across the crest 41 of the ridge 40 and positioned adjacent the sloping cam surface 42 of the ridge 40, as shown in FIGS. 3a-3b.

As the lever 23 is pivoted upwards, i.e. away from the vehicle 2, the cam surface 23c of the lever 23 tightens the bracket 21 to the rail 5 of the vehicle 2 by being braced against the cam surface 42 of the ridge 40, providing a clamping force between the support surface 12 of the load carrier foot 10 and the bracket 21 of the load carrier foot 10, as shown in FIGS. 4a-4b. The load carrier foot 10 is now secured to the vehicle 2.

To remove the load carrier foot 10, the lever 23 is pivoted downwards, towards the vehicle 2, to the position shown in FIGS. 3a-3b. The lever 23, with the cam surface 23c, is displaced back over the crest 41 of the ridge 40 (FIGS. 2c-2d) and away from the cam surface 42 of the ridge 40, back to the position shown in FIGS. 2a-2b. The bracket 21 is "opened" so that the distance D, the gap, between the bracket 21 and the support surface 12 of the load carrier foot 10 is maximized, permitting the load carrier foot 10 to be easily removed from the rail 5 of the vehicle 2.

According to an embodiment, the cam surface 42 of the ridge 40 has a form which substantially corresponds to the form of the cam surface 23c of the lever 23.

FIG. 4b shows the lever 23 in the lock position, and the elongated element positioned in the second position or ready position. As is notable, the cam surface 23c of the lever 23 and the cam surface 42 of the ridge 40 have a corresponding form with respect to each other, at least in the cross section as shown in FIG. 4b and when the lever 23 is in the lock position and the elongated element 22 is in the second position. This ensures a steady connection.

According to an embodiment, the lever 23 can be extendable, preferably in a telescopic manner. An extendable lever can be advantageous both from a space saving point of view and from a leverage point of view, as an extended lever can improve the amount of transferrable torque to the bracket 21 of the load carrier foot 10.

The load carrier foot 10 can optionally comprise a lever lock. The lever lock can be formed by a cover for the load carrier foot 10 for example, such as a pivotable cover, which simultaneously protects the interior of the load carrier foot 10 while at the same time locks the position of the lever 23, when the lever 23 is in the lock position.

Figure 5:
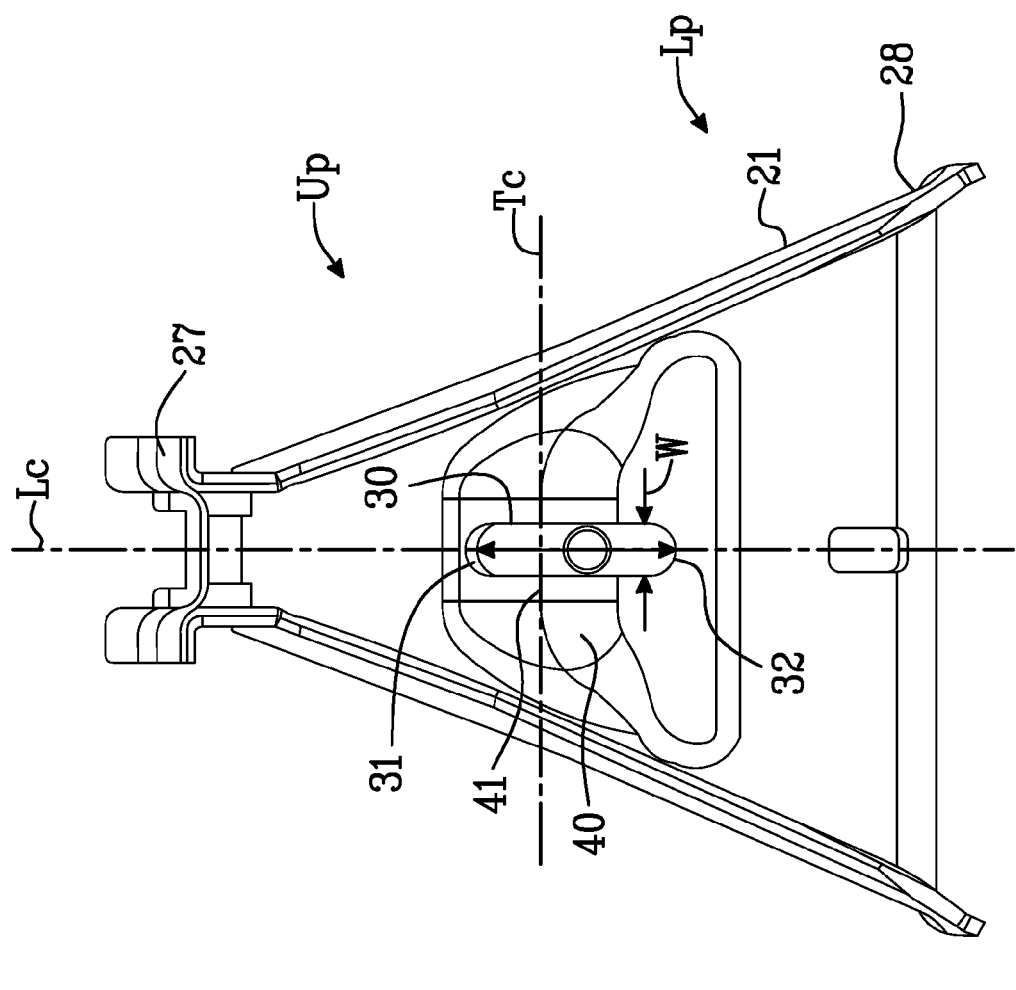
FIG. 5 shows the bracket of the load carrier foot of FIG. 1 in greater detail.

FIG. 5 shows the bracket 21 in greater detail, with a view along the length of the load carrier bar (not shown). FIG. 5 shows the load carrier bar retaining portion 27 and a rail retaining portion 28. The rail retaining portion 28 advantageously comprises a rubber like support member attached thereto (not shown in FIG. 5). Substantially at the center of the bracket 21 is the elongated aperture 30 arranged extending across the crest 41 of the ridge 40. The elongated aperture 30 has a substantially elongated extension comprising a first and a second end 31, 32. In the shown embodiment, the elongated aperture has a straight form, i.e. an I-form when seen from the view of FIG. 5. It should be noted that the elongated aperture 30 could has an arc shaped form such as a C-shaped form, >-shaped form, <-shaped form, V-shaped form, or the like. The first and the second end 31, 32 of the elongated aperture 30 are distanced from each other in a vertical direction by a distance L. The length L between the first and the second end 31, 32 of the elongated aperture 30 can be from 10-70 mm, preferably 12-60 mm. The width W is selected dependent upon the required strength of the elongated element 22 (not shown in FIG. 5) which determines the diameter of the elongated element 22 and thus the width W of the elongated aperture 30. An appropriate width W ranges from 3-15 mm, preferably 4-10 mm. Generally the width W should be just slightly wider than the diameter than the elongated element 22, at least at the portion of the elongated element 22 that extends through the elongated aperture 30.

Independently of the shape and form of the elongated aperture 30, the elongated aperture. The elongated aperture advantageously extends from a lower portion Lp of the bracket to an upper portion Up of the bracket 21, preferably as shown in FIG. 5. It also preferably extends along a longitudinal centreline Lc of the bracket 21. A transverse centreline Tc can be used to define the upper and the lower portion of the bracket, the elongated aperture thus at least extends across the transverse centreline of the bracket.

In an embodiment, the elongated element 22 has a cross section, the area of the cross section of the elongated element 22, at least at the portion of the elongated element 22 that extends through the elongated aperture 30, should be at least 5 times smaller than the area of the aperture 30. Optionally the diameter of the cross section of the elongated element 22, at least at the portion of the elongated element 22 that extends through the elongated aperture 30, is at least 5 times smaller than the length L of the elongated aperture 30. This ensures that the elongated element 22 can be moved along the elongated aperture 30 a sufficient length to provide a distinct difference between the release position and the ready position.

Instead of having a ridge 40 on the bracket 21 as described above, the bracket 21 can be provided with a brace surface, formed by any suitable protruding portion on the bracket 21, the brace surface could be formed by a fold or similar on the bracket 21 for example.

The ridge 40 can be formed by a protruding portion followed by an indent on the bracket as shown in FIGS. 2a-2d, and with respect to a cross section as shown in FIGS. 2a-2d. It is notable that there are other ways of forming a ridge to provide a good cam surface as discussed herein. The bracket can be provided with an indent or groove. The rim of the indent or groove can be considered to be a ridge which provides the brace surface.

Figure 6:
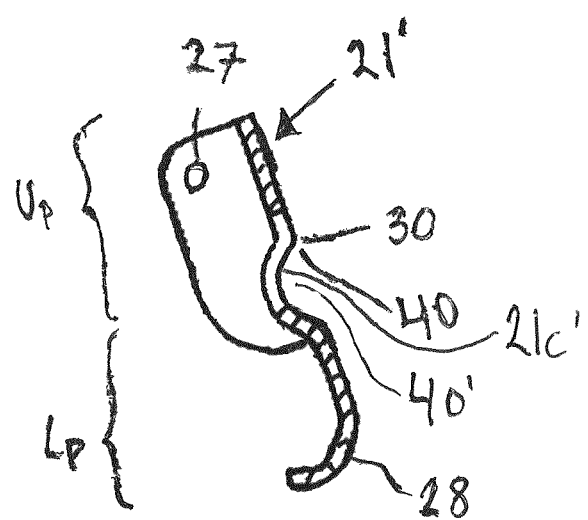
FIG. 6 shows a cross sectional view of an embodiment of a bracket for a load carrier foot.

FIG. 6 shows a cross section of another embodiment of a bracket 21' for a load carrier foot 10 as described above, or any other suitable load carrier foot for a roof rack. The bracket 21' has an upper portion Up and a lower portion Lp. The lower portion Lp comprises a rail retaining portion 28. The rail retaining portion 28 advantageously comprises a rubber like support member attached thereto (not shown in FIG. 6). An aperture 27' is arranged at the upper portion of Up of the bracket 21' permitting the bracket 21' to be pivotally attached to a load carrier foot. The bracket 21' comprises an elongated aperture 30 through which an elongated element, such as the elongated element 22 (shown in FIG. 3b for example) can extend. The width of the elongated aperture 30 corresponds to the width of the elongated aperture 30 of FIG. 5.

The elongated aperture 30 is arranged substantially at the center of the bracket 21' extending into the upper portion Up of the bracket 21'. The bracket 21' comprises an indent 40', or groove, comprising a ridge 40, formed by the rim of the indent 40'. The width of the indent corresponds to the width of the ridge 40 of FIG. 5. A handle 23 having a cam surface 23c as shown in FIG. 4b for example when positioned in the indent 40', can brace against the rim 40 provided by the indent 40' in a similar manner as shown in FIG. 4b. The elongation of the aperture 30 simplifies the release of a load carrier foot as an elongated element is permitted ti be slightly displaced along the length of the elongated aperture 30. Please notice that the bracket 21' is mirrored with respect to the bracket 21 of FIG. 4b. The shape and form of the indent 40' is adapted to correspond to the shape and form of the cam surface 23c of the handle 23. Parts of the a cam surface 21c' can further be seen.

In the embodiment shown in FIG. 6, the ridge 40 partly formed by the indent 40' extends substantially transverse across the longitudinal extension of the elongated aperture 30.

The brackets 21, 21' described above both comprises a ridge providing the bracket 21, 21' with a cam surface. The cam surface can interact in a working cooperation with the attachment arrangement and if the attachment arrangement comprises a lever, with a cam surface of the lever. The cam surface of the lever preferably has a corresponding form to the form of the cam surface of the bracket, as is illustrated in the accompanying figures in which the cam surface has a convex arc shaped form and the cam surface of the bracket has a corresponding concave arc shaped form.

The invention claimed is:

1. A load carrier foot for attaching a load carrier bar to a vehicle, said load carrier foot comprising:
    a body comprising a support surface, said support surface being adapted to rest against a first portion of said vehicle,
    a bracket comprising an aperture and adapted to grip about a second portion of said vehicle, and
    an attachment arrangement for providing a clamping force between said support surface of said body and said bracket, a portion of said attachment arrangement extending through said aperture of said bracket, wherein said aperture of said bracket is an elongated aperture, wherein said attachment arrangement comprises an elongated element and a lever, wherein said elongated element extends through said elongated aperture, wherein said elongated element is displaceable along said elongated aperture between at least a release position and a ready position, wherein in said ready position, said attachment arrangement is enabled to impart said clamping force, wherein said lever comprises a cam surface adapted to be braced against a cam surface of said bracket to provide said clamping force when said elongated element is positioned in said ready position, wherein said cam surface of said bracket is at least partly formed by a ridge comprising a crest, and wherein said ready position and said release position are separated by said crest of said ridge.

2. The load carrier according to claim 1, wherein said ridge is at least partly formed by a portion of said bracket.

3. The load carrier according to claim 1, wherein said ridge is formed by a separate piece of material with respect to said bracket.

4. The load carrier according to claim 1, wherein said cam surface of said bracket comprises a first and a second cam surface, said first and said second cam surfaces being separated by said elongated aperture.

5. The load carrier according to claim 1, wherein said bracket comprises a load carrier bar retaining portion, said load carrier bar retaining portion of said bracket being adapted to cooperate with said load carrier bar.

6. The load carrier according to claim 1, wherein said lever is extendable.

7. The load carrier according to claim 1, wherein said cam surface of said lever has a form corresponding to said cam surface of said bracket.

8. The load carrier according to claim 1, wherein said elongated aperture comprises a first and a second end, said first end being distanced a distance from said second end in a vertical direction.

9. The load carrier according to claim 8, wherein said release position and said ready position is defined by said first and said second ends of said elongated aperture.

10. The load carrier according to claim 1, wherein said elongated aperture extends across said cam surface of said bracket.

11. A roof rack for a vehicle comprising a load carrier bar and at least one load carrier foot, said load carrier foot comprising:

a body comprising a support surface, said support surface being adapted to rest against a first portion of said vehicle, a bracket comprising an aperture and adapted to grip about a second portion of said vehicle, and an attachment arrangement for providing a clamping force between said support surface of said body and said bracket, a portion of said attachment arrangement extending through said aperture of said bracket, wherein said aperture of said bracket is an elongated aperture, wherein said attachment arrangement comprises an elongated element and a lever, wherein said elongated element extends through said elongated aperture, wherein said elongated element is displaceable along said elongated aperture between at least a release position and a ready position, wherein in said ready position, said attachment arrangement is enabled to impart said clamping force, wherein said lever comprises a cam surface adapted to be braced against a cam surface of said bracket to provide said clamping force when said elongated element is positioned in said ready position, wherein said cam surface of said bracket is at least partly formed by a ridge comprising a crest, and wherein said ready position and said release position are separated by said crest of said ridge.

* * * * *